(12) United States Patent
Siu et al.

(10) Patent No.: US 9,465,383 B2
(45) Date of Patent: Oct. 11, 2016

(54) APPARATUS AND METHOD OF USING AN IMAGING DEVICE FOR ADJUSTMENT OF AT LEAST ONE HANDLING DEVICE FOR HANDLING SEMICONDUCTOR COMPONENTS

(71) Applicants: Hing Suen Siu, Kwai Chung (HK); Yu Sze Cheung, Kwai Chung (HK); Chi Wah Cheng, Tsing Yi (HK); Chung Yan Lau, Kwai Chung (HK)

(72) Inventors: Hing Suen Siu, Kwai Chung (HK); Yu Sze Cheung, Kwai Chung (HK); Chi Wah Cheng, Tsing Yi (HK); Chung Yan Lau, Kwai Chung (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 311 days.

(21) Appl. No.: 14/311,856

(22) Filed: Jun. 23, 2014

(65) Prior Publication Data

US 2015/0370244 A1 Dec. 24, 2015

Related U.S. Application Data

(60) Provisional application No. 61/839,922, filed on Jun. 27, 2013, provisional application No. 61/930,744, filed on Jan. 23, 2014.

(51) Int. Cl.
*G06F 7/00* (2006.01)
*G05B 19/418* (2006.01)

(52) U.S. Cl.
CPC . *G05B 19/4182* (2013.01); *G05B 2219/39106* (2013.01); *G05B 2219/40554* (2013.01); *G05B 2219/45031* (2013.01); *G05B 2219/45054* (2013.01); *Y02P 90/083* (2015.11)

(58) Field of Classification Search
USPC .......................................................... 700/218
See application file for complete search history.

(56) References Cited

U.S. PATENT DOCUMENTS

| 7,471,819 | B2* | 12/2008 | Ichikawa | G01R 31/2887 |
| | | | | 382/145 |
| 8,816,709 | B2* | 8/2014 | Shiozawa | G01R 31/2891 |
| | | | | 324/750.13 |
| 9,285,393 | B2* | 3/2016 | Kikuchi | G01R 1/0466 |
| 2002/0184755 | A1* | 12/2002 | Suhara | H05K 13/0069 |
| | | | | 29/833 |
| 2008/0317575 | A1* | 12/2008 | Yamazaki | G01R 31/2893 |
| | | | | 414/754 |

* cited by examiner

*Primary Examiner* — Kyle Logan
(74) *Attorney, Agent, or Firm* — Ostrolenk Faber LLP

(57) ABSTRACT

Disclosed is an apparatus for handling electronic components. The apparatus comprises: i) a rotary device and a plurality of pick heads arranged circumferentially around the rotary device, each pick head being operable to hold an electronic component; ii) a position-determining device for determining an arrangement of the electronic components as held by the respective pick heads; iii) a fiducial mark arranged in a position that is indicative of the arrangement of the electronic components, as determined by the position-determining device; iv) a first imaging device arranged relative to the fiducial mark; and v) at least one handling device for handling the electronic components. Specifically, the first imaging device is operable to capture at least one image comprising the fiducial mark and the at least one handling device so that a position of the at least one handling device is adjustable to align the at least one handling device with respect to the arrangement of the electronic components, based on an offset between the fiducial mark and the at least one handling device as derived from the at least one image captured by the first imaging device. A method of adjusting the position of at least one handling device of an apparatus for handling electronic components is also disclosed.

16 Claims, 8 Drawing Sheets

APPARATUS AND METHOD OF USING AN IMAGING DEVICE FOR ADJUSTMENT OF AT LEAST ONE HANDLING DEVICE FOR HANDLING SEMICONDUCTOR COMPONENTS

FIELD OF THE INVENTION

This invention relates to an apparatus for, and method of, adjusting the position of one or more handling devices that handle semiconductor components through the use of an imaging device.

BACKGROUND OF THE INVENTION

A conventional test handler comprises a turret and pick heads coupled to the turret for holding semiconductor packages. During operation, the turret rotates above various handling devices, such as a testing module for testing the performance of the semiconductor packages. Specifically, a pick head holding a semiconductor package moves to the testing module in order to test the semiconductor package. In particular, the testing module has to be aligned with respect to the semiconductor packages as held by the respective pick heads, in order to achieve good machine stability, a high function test yield, and a low rate of package damage.

At present, the alignment or positional adjustment between the testing module and the semiconductor packages is achieved by using human judgment. Since human judgment is subjective and requires the operation of the test handler to be visualized, it becomes difficult or even impossible if the size of the semiconductor packages is very small. Additionally, this method requires considerable human skill and labour, due to an absence of data to serve as a basis for accuracy.

Thus, it is an object of this invention to seek to ameliorate the aforesaid disadvantages of the conventional method for aligning one or more handling devices that handle semiconductor packages, and to provide the general public with a useful choice.

SUMMARY OF THE INVENTION

A first aspect of the invention is an apparatus for handling electronic components. The apparatus comprises: i) a rotary device and a plurality of pick heads arranged circumferentially around the rotary device, each pick head being operable to hold an electronic component; ii) a position-determining device for determining an arrangement of the electronic components as held by the respective pick heads; iii) a fiducial mark arranged in a position that is indicative of the arrangement of the electronic components, as determined by the position-determining device; iv) a first imaging device arranged relative to the fiducial mark; and v) at least one handling device for handling the electronic components. In particular, the first imaging device is operable to capture at least one image comprising the fiducial mark and the at least one handling device so that a position of the at least one handling device is adjustable to align the at least one handling device with respect to the arrangement of the electronic components, based on an offset between the fiducial mark and the at least one handling device as derived from the at least one image captured by the first imaging device.

A second aspect of the invention is a method of adjusting the position of at least one handling device of an apparatus for handling electronic components, the apparatus comprising a rotary device and a plurality of pick heads arranged circumferentially around the rotary device, the method comprising the steps of: determining an arrangement of the electronic components as held by the respective pick heads using a position-determining device; capturing at least one image comprising the fiducial mark and the at least one handling device using a first imaging device, wherein the fiducial mark is arranged in a position that is indicative of the arrangement of the electronic components, as determined by the position-determining device; and adjusting the position of the at least one handling device to align the at least one handling device with respect to the arrangement of the electronic components, based on an offset between the fiducial mark and the at least one handling device as derived from the at least one image captured by the first imaging device.

BRIEF DESCRIPTION OF THE DRAWINGS

Preferred embodiments of the present invention will be described, by way of example only, with reference to the accompanying drawings, of which:

FIG. 2b shows a repositioning of the fiducial mark to align with respect to an optical centre of the look-up vision system, while

FIG. 11 shows a repositioning of a semiconductor component with respect to the optical centre of the look-up vision system in the test handler of FIG. 2a.

DETAILED DESCRIPTION OF THE PREFERRED EMBODIMENTS

Figure 1A:
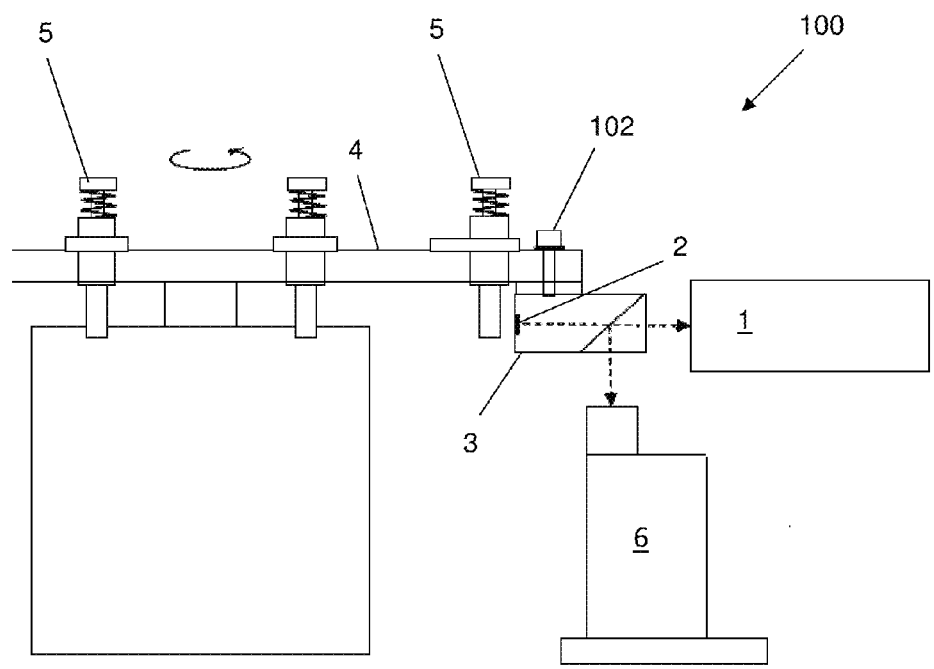
FIG. 1a and FIG. 1b are respective side and top views of a test handler for handling semiconductor components, comprising an optical device with a fiducial mark, and a side vision system.
Figure 1B:
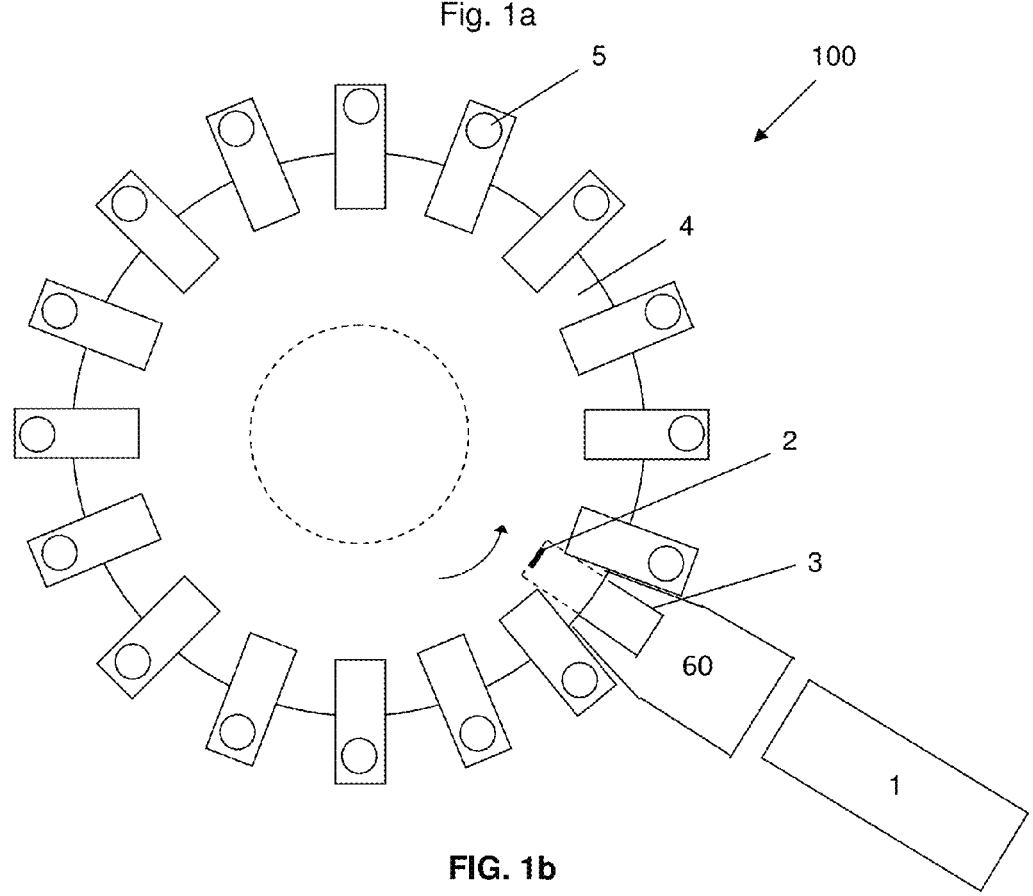
Figure 3:
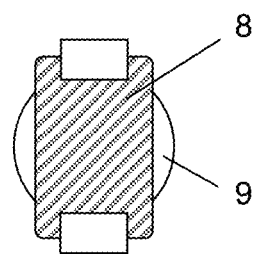
FIG. 3 shows a semiconductor component being held by a pick head.

According to a preferred embodiment of the present invention, FIG. 1a is a side view of an apparatus (shown as a test handler 100) for handling semiconductor components, such as semiconductor packages (one of which is shown by the reference number 8 in FIG. 3, and which is held by a pick head collet 9). A top view of the test handler 100 is shown in FIG. 1b.

Figure 2A:
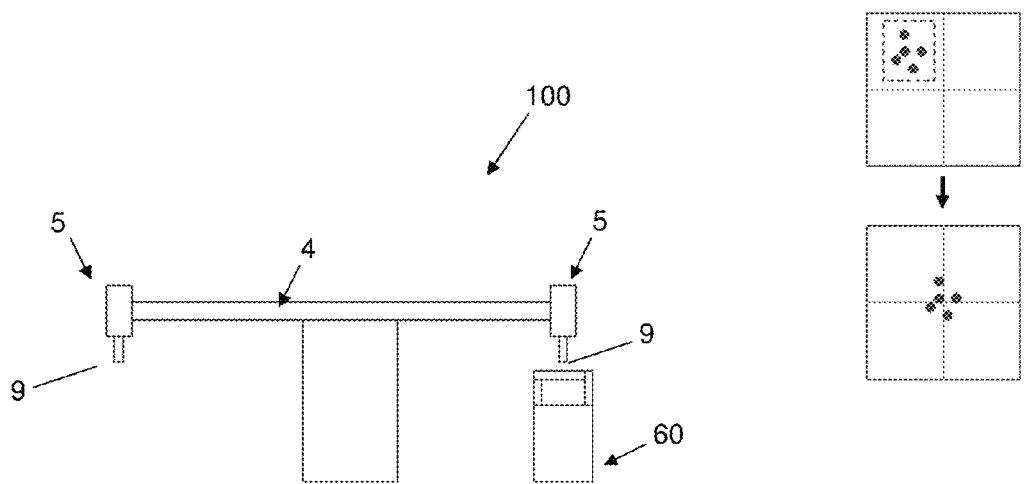
FIG. 2a is a side of a configuration of the test handler shown in FIG. 1a and FIG. 1b, comprising a look-up vision system.
Figure 2B:
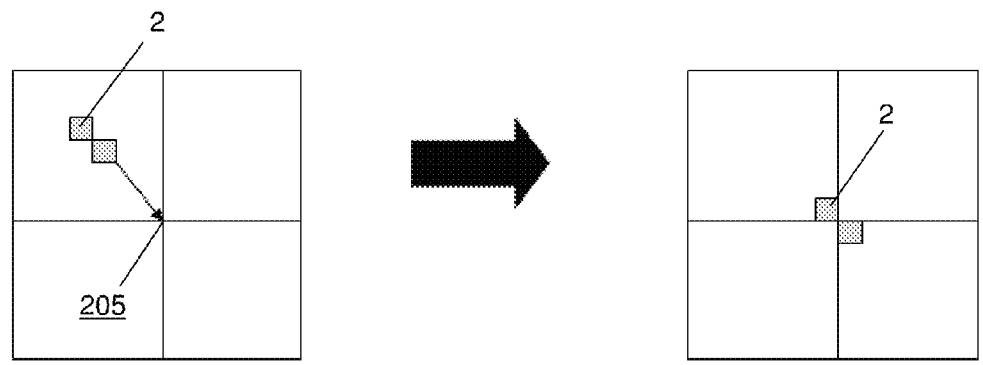
Figure 2C:
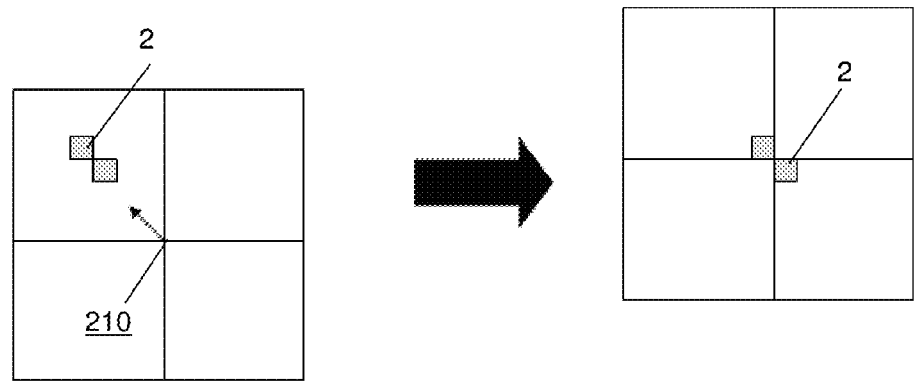
FIG. 2c shows a repositioning of the side vision system to align an optical centre of the side vision system with respect to the repositioned fiducial mark shown in FIG. 2b.
Figure 5:
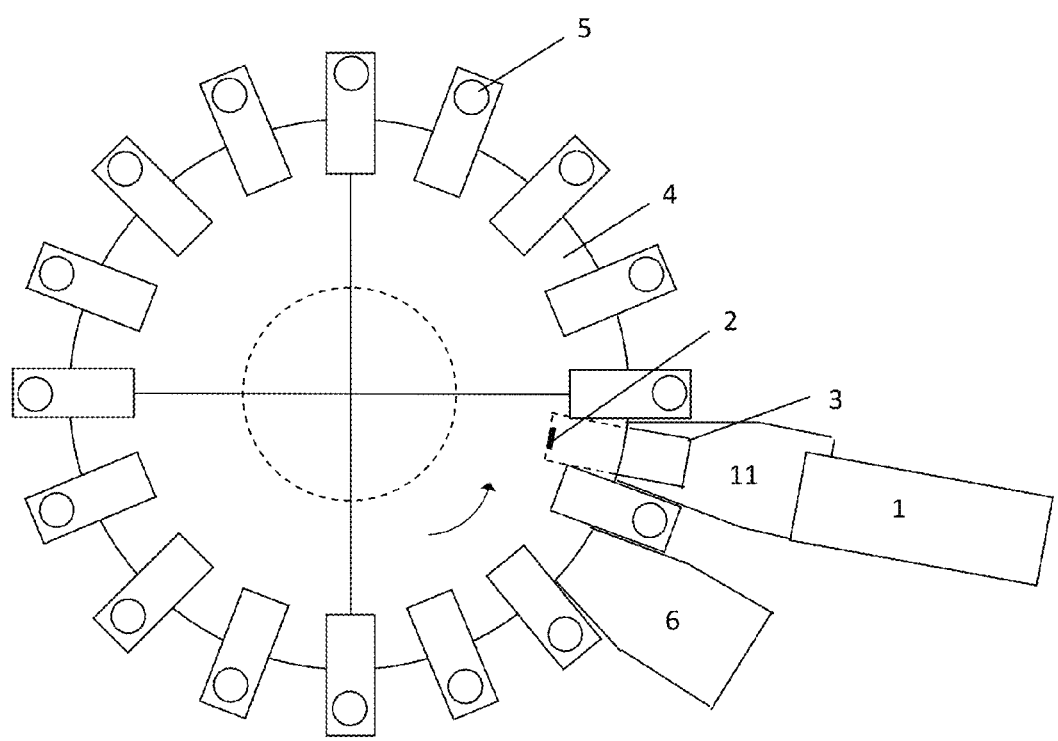
FIG. 5 shows another configuration of the test handler, further comprising a contactor for testing electronic components.

The test handler 100 comprises: i) a rotary device (shown as a turret 4); ii) a plurality of pick heads 5 arranged circumferentially around the turret 4, wherein each pick head 5 is operative to hold a semiconductor package 8; iii) a position-determining device 6 for determining an arrangement of the semiconductor packages 8 (e.g. a look-up vision system 60 which is shown in FIG. 2c); iv) at least one handling device for handling the semiconductor packages 8 (e.g. a contactor 11 for testing semiconductor components as shown in FIG. 5); v) an optical device 3 mounted to the turret 4 via one or more screws 102, wherein the optical device 3 comprises a fiducial mark 2; and vi) a side vision system 1 arranged with respect to the optical device 3.

The optical device 3 is configured to transmit to the side vision system 1 an image of the fiducial mark 2, as well as a representative image of the contactor 11. The optical device 3 may be a beam-splitter, a mirror, or a prism for reflecting images, and is mounted to the turret 4 at a position between two adjacent pick heads 5, as shown in FIG. 1b. The fiducial mark 2 is a pattern which can be easily inspected by the side vision system 1. In this case, the fiducial mark 2 is a chessboard pattern (see, for example, FIGS. 2b and 2c), but other patterns may also be used. Preferably, the image of the fiducial mark 2 is overlaid (or superimposed) on the representative image of the contactor 11 in an image as captured by the side vision system 1. Specifically, the side vision system 1 comprises a camera, optics and lighting for inspecting the positions of the fiducial mark 2. The side vision system 1 may be mounted on a bolster plate.

It should be appreciated that the representative image of the contactor 11 may include any image that is indicative of the position of the contactor 11, and may comprise one or more parts of the contactor 11 and/or a mark that is derived from the contactor 11.

The use of the fiducial mark 2 as a reference mark for positional adjustment of one or more handling devices, such as the contactor 11, will now be described.

FIG. 2a shows a side view of the test handler 100, whereby the position of the semiconductor packages 8 as held by the respective pick heads 5 are captured by the look-up vision system 60 for subsequent analysis via image processing. Specifically, the look-up vision system 60 is repositioned to align its optical centre relative to the position of the semiconductor packages 8 as held by the respective pick heads 5. However, it should be appreciated that the repositioning of the look-up vision system 60 may not be necessary so long as an average offset between the optical centre of the look-up vision system 60 and the arrangment of the semiconductor packages 8 as held by the respective pick heads 5 can be determined.

Next, as the look-up vision system 60 remains fixed in position, the turret 4 rotates to arrange the optical device 3 above the look-up vision system 60, as shown in FIG. 1b. The side vision system 1 moves in a synchronized motion with the turret 4 so that the relative arrangement between the side vision system 1 and the turret 4 remains the same. This may be done by coupling the side vision system 1 to the turret 4. Alternatively, the side vision system 1 may be separate from the turret 4 and mounted on an actuator that moves synchronously with the turret 4. Yet further, multiple side vision systems 1 may be arranged around the turret 4.

Figure 4:
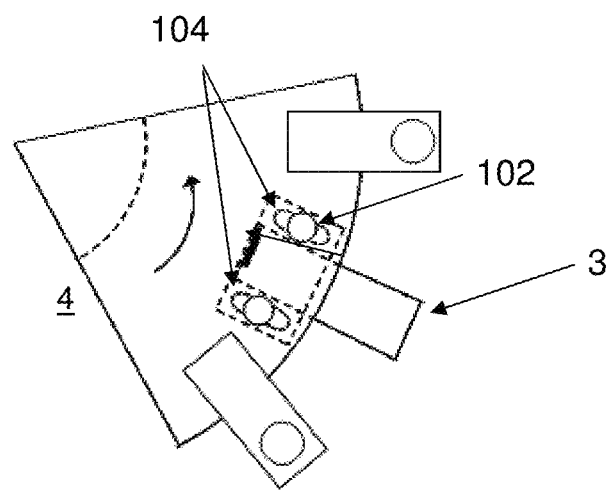
FIG. 4 shows a repositioning of the optical device in the test handler, in order to reposition the fiducial mark as shown in FIG. 2b.

The position of the fiducial mark 2 is then captured by the look-up vision system 60 to be analyzed via image processing. Preferably, the fiducial mark 2 is repositioned such that it is aligned with an optical centre 205 of the look-up vision system 60, as shown in FIG. 2b. Since the optical device 3 is directly attached to the turret 4 via the screws 102, the alignment or positional adjustment of the fiducial mark 2 may be performed by loosening the screws 102 and repositioning the optical device 3 along respective tracks 104 along which the screws 102 engage to secure the optical device 3 to the turret 4, as shown in FIG. 4. In the instance whereby the optical centre 205 of the look-up vision system 60 is positioned relative to the position of the semiconductor packages 8 as held by the respective pick heads 5, the repositioning of the fiducial mark 2 at the optical centre 205 of the look-up vision system 60 means that the position of the fiducial mark 2 can serve as a positional reference of those semiconductor packages 8. After the fiducial mark 2 has been aligned, it will then serve as a common reference mark for adjusting the position of the contactor 11, and all other handling devices as well.

However, it should again be appreciated that the repositioning of the fiducial mark 2 may not be necessary so long as an offset between the optical centre 205 of the look-up vision system 60 and the fiducial mark 2 can be determined.

Thereafter, the position of the fiducial mark 2 is captured by the side vision system 1 and analyzed via image processing. Preferably, the side vision system 1 is repositioned such that its optical centre 210 aligns with the fiducial mark 2, as shown in FIG. 2c, but such repositioning may again be omitted so long as an offset between the fiducial mark 2 and the optical centre 210 of the side vision system 1 can be determined.

The positional adjustment of the contactor 11 will now be described.

Figure 6:
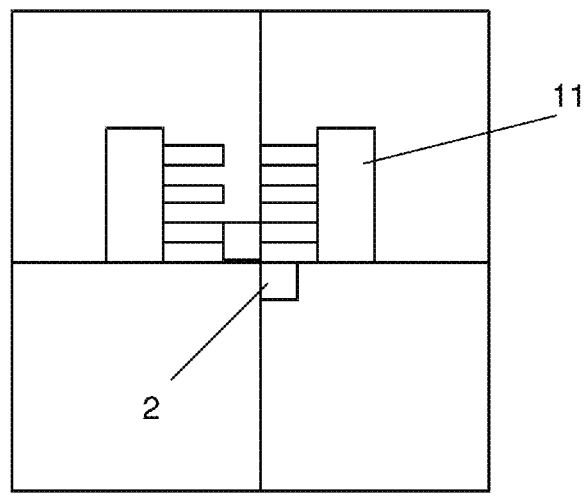
FIG. 6 shows an image captured by the side vision system in the test handler, comprising the aligned fiducial mark and the contactor.
Figure 7:
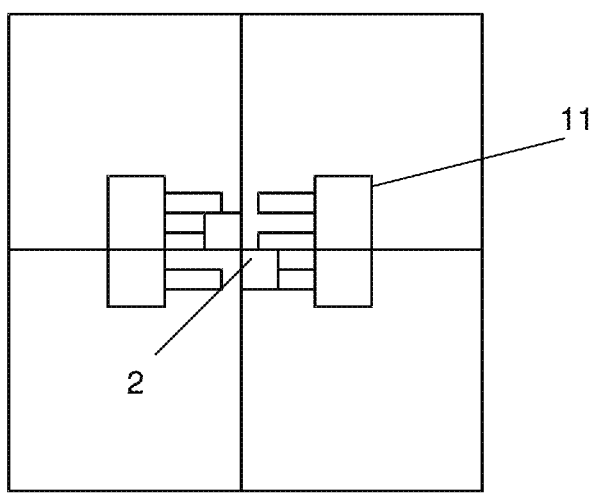
FIG. 7 shows an alignment of the contactor with the aligned fiducial mark.

First, and as shown in FIG. 5, the turret 4 is indexed to arrange the optical device 3 above the contactor 11. The side vision system 1 then captures an image comprising the fiducial mark 2 and the contactor 11, as shown in FIG. 6. Specifically, an image of the fiducial mark 2 is transmitted through the optical device 3 to the side vision system 1, whereas an image of the top side of the contactor 11 is reflected by the optical device 3 to the side vision system 1. The image that is captured by the side vision system 1 is then analyzed to derive an offset between the fiducial mark 2 and the contactor 11. Thereafter, the position of the contactor 11 is adjusted with respect to the fiducial mark 2 based on the derived offset, as shown in FIG. 7. Alignment is achieved when the offset between the fiducial mark 2 and the contactor 11 falls within a stipulated criterion. This thereby ensures that the semiconductor packages 8 are properly aligned with the contactor 11 when as they are held by the pick heads 5 of the test handler 100 during operation. In the instance whereby the optical centre 210 of the side vision system 1 is aligned with respect to the aligned fiducial mark 2, the repositioning of the contactor 11 at the optical centre 210 of the side vision system 1 can also achieve the alignment of the contactor 11 with the semiconductor packages 8.

Figure 8:
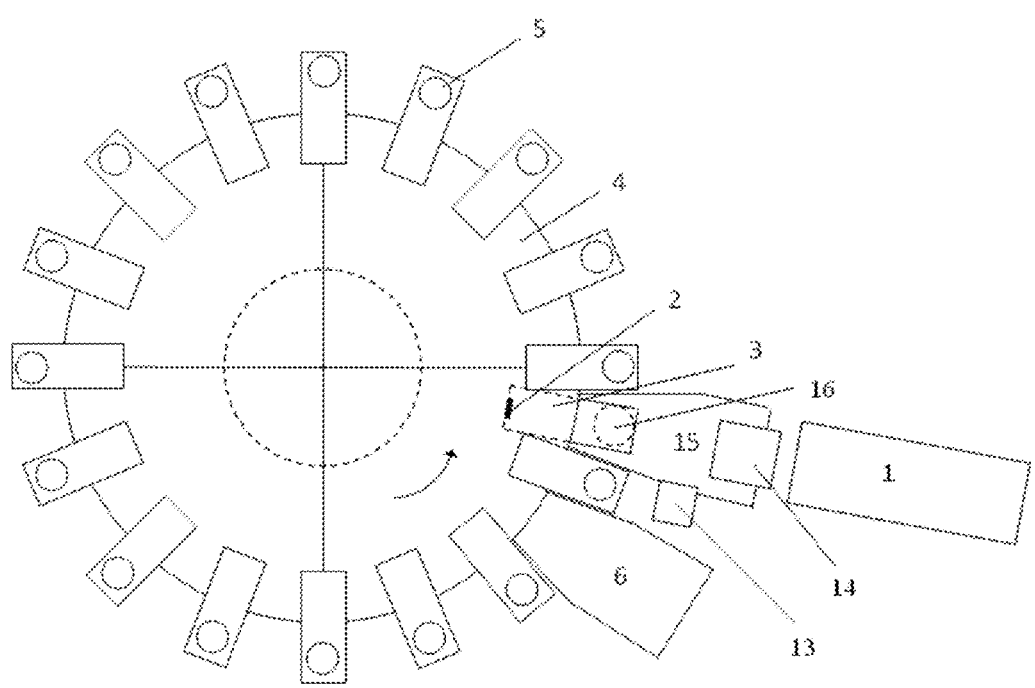
FIG. 8 shows a further configuration of the test handler shown in FIG. 5, wherein the contactor is motorized.

Optionally, the contactor 11 may comprise motors 13, 14, 16 to provide tangential, radial and theta motion relative to the motion path of the semiconductor packages 8, as shown in FIG. 8. With such a motorized contactor 11, after the offset between the fiducial mark 2 and the motorized contactor 11 has been derived from one or more images captured by the side vision system 1, a host processor can accordingly send corresponding instructing signals to the motors 13, 14, 16 to compensate for the offset, for example in terms of a distance-and-angle difference between the fiducial mark 2 and the motorized contactor 11 to adjust the position of the contactor 11 with respect to the semiconductor packages 8 for handling.

Figure 9:
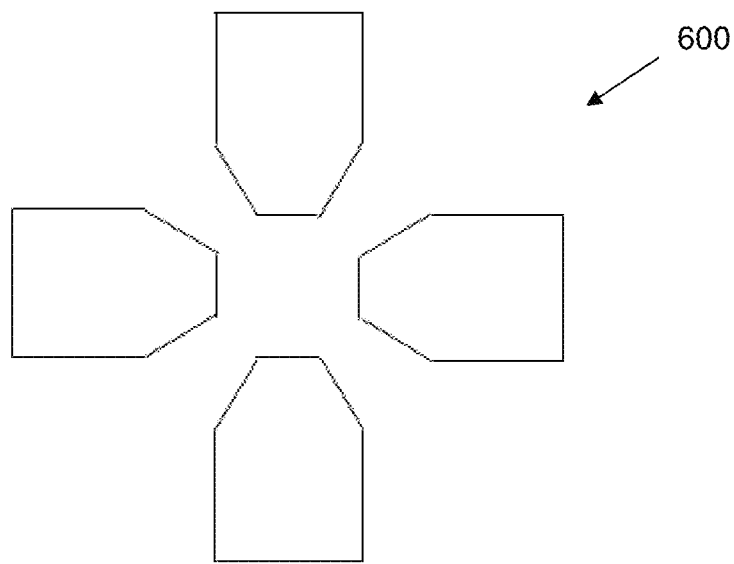
FIG. 9 shows a precisor module for setting an arrangement of the electronic components when held by the respective pick heads.

In another configuration of the test handler 100, the position-determining device 6 is a precisor module 600 shown in FIG. 9, in place of the look-up vision system 60. The precisor module 600 is operable and configured to set the arrangement of the semiconductor packages 8 as they are held by the respective pick heads 5 of the test handler 100 during operation. Preferably, the precisor module 600 is first aligned relative to the position of the pick heads 5, before the pick heads 5 proceed to pick the semiconductor packages 8. Thereafter, the pick heads 5 move through the precisor module 600 so that the arrangement of the semiconductor packages 8 is determined by the precisor module 600. The turret 4 then rotates to index the optical device 3 to a position above the precisor module 600. Again, the side vision system 1 moves in a synchronized motion with the turret 4 so that the relative arrangement between the side vision system 1 and the turret 4 remains the same.

Figure 10:
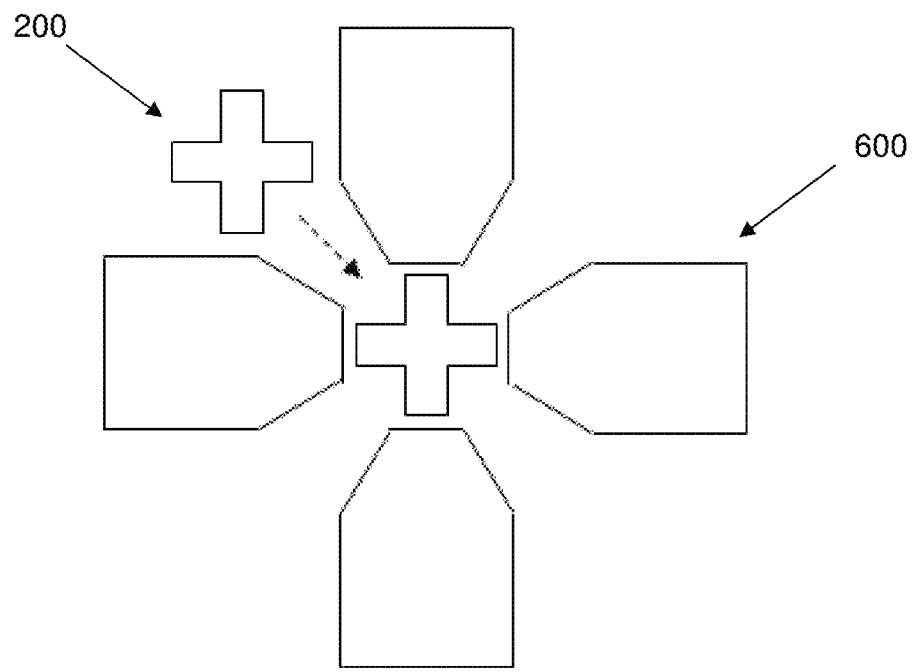
FIG. 10 shows a repositioning of an alternative fiducial mark to align with respect to the precisor module shown in FIG. 9.

FIG. 10 shows an image captured by the side vision system 1, comprising an alternative fiducial mark 200 and the precisor module 600. The captured image is then analyzed to derive an offset between the position of the fiducial mark 200 and the position of the precisor module 600. Thereafter, the position of the optical device 3 is adjusted based on the derived offset, so that the fiducial mark 200 is repositioned to align with the precisor module 6 by adjusting the position of the optical device 3 as shown in FIG. 10. In this way, the repositioned fiducial mark 200 can again serve as a positional reference of the semiconductor packages 8 as held by the respective pick heads 5.

Advantageously, the test handler 100 can achieve a higher accuracy of the alignment of one or more handling devices with respect to the arrangement of the semiconductor packages 8 for handling, as opposed to the conventional method of using human judgment. In addition, the side vision system 1 provides a clear visual which eases the process of deriving alignment-related and quantitative measurements. Further, automatic alignment is also possible with the implementation of the motors 13, 14, 16 on the handling device(s) for positional adjusting with respect to the semiconductor packages 8 as held by the pick heads 5.

Figure 11:
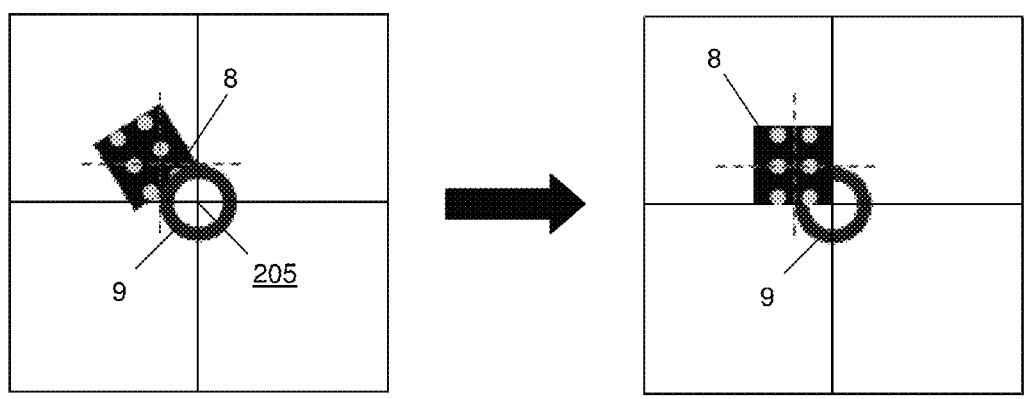

It should be appreciated that various embodiments of the test handler 100 may also fall within the scope of this invention. For instance, the alignment process described above is equally applicable for the positional adjustment of any sort of handling device that handles semiconductor components. The term "handling" should be construed as including any sort of testing or packaging of semiconductor components. Moreover, the look-up vision system 60 can further be used to orientate the position of semiconductor packages 8 that are held by the pick heads 5 of the test handler 100. In particular, each pick head 5 may comprise an independent driver that is capable of rotational motion about a vertical Z-axis to allow for theta correction, so as to orientate and align the semiconductor package 8 that is held by the pick head collet 9 with respect to the optical centre 205 of the look-up vision system 60, as shown in FIG. 11.

The invention claimed is:

1. An apparatus for handling electronic components, the apparatus comprising:
a rotary device and a plurality of pick heads arranged circumferentially around the rotary device, each pick head being operable to hold an electronic component;
a position-determining device for determining an arrangement of the electronic components as held by the respective pick heads;
a fiducial mark arranged in a position that is indicative of the arrangement of the electronic components, as determined by the position-determining device;
a first imaging device arranged relative to the fiducial mark; and
at least one handling device for handling the electronic components,
wherein the first imaging device is operable to capture at least one image comprising the fiducial mark and the at least one handling device so that a position of the at least one handling device is adjustable to align the at least one handling device with respect to the arrangement of the electronic components, based on an offset between the fiducial mark and the at least one handling device as derived from the at least one image captured by the first imaging device.

2. The apparatus of claim 1, wherein the at least one handling device is motorized and is operable to automatically align with respect to the arrangement of the electronic components.

3. The apparatus of claim 1, wherein the position-determining device is a precisor module which is operable to set the arrangement of the electronic components as held by the respective pick heads.

4. The apparatus of claim 1, wherein the position-determining device is a second imaging device which is operable to determine the arrangement of the electronic components.

5. The apparatus of claim 4, wherein the fiducial mark is movable to align with respect to an optical centre of the second imaging device.

6. The apparatus of claim 5, wherein the first imaging device is movable to align an optical centre of the first imaging device with respect to the aligned fiducial mark.

7. The apparatus of claim 6, wherein the at least one handling device is movable to align with respect to the optical centre of the first imaging device.

8. The apparatus of claim 1, further comprising an optical device which is operable to transmit respective images of the fiducial mark and the at least one handling device to the first imaging device.

9. The apparatus of claim 8, wherein the optical device is a device selected from a group consisting of: i) a beam-splitter; ii) a mirror; and iii) a prism.

10. A method of adjusting the position of at least one handling device of an apparatus for handling electronic components, the apparatus comprising a rotary device and a plurality of pick heads arranged circumferentially around the rotary device, the method comprising the steps of:
determining an arrangement of the electronic components as held by the respective pick heads using a position-determining device;
capturing at least one image comprising the fiducial mark and the at least one handling device using a first imaging device, wherein the fiducial mark is arranged in a position that is indicative of the arrangement of the electronic components, as determined by the position-determining device; and
adjusting the position of the at least one handling device to align the at least one handling device with respect to the arrangement of the electronic components, based on an offset between the fiducial mark and the at least one handling device as derived from the at least one image captured by the first imaging device.

11. The method of claim 10, wherein the at least one handling device is motorized, and the step of adjusting the position of the least handling device is automatically performed.

12. The method of claim 10, wherein the position-determining device is a second imaging device, and the method comprises the step of capturing respective images of the electronic components to determine the arrangement of the electronic components.

13. The method of claim 12, further comprising the step of positioning the second imaging device such that an optical centre of the second imaging device is aligned with respect to the arrangement of the electronic components.

14. The method of claim 13, further comprising the step of positioning the fiducial mark such that the fiducial mark is aligned with respect to the optical centre of the second imaging device.

15. The method of claim 14, further comprising the step of positioning the first imaging device such that an optical centre of the first imaging device is aligned with respect to the aligned fiducial mark.

16. The method of claim 15, wherein the step of adjusting the position of the at least one handling device comprises aligning the at least one handling device with respect to the optical centre of the first imaging device.

\* \* \* \* \*